(12) United States Patent
Moelle et al.

(10) Patent No.: US 12,545,117 B2
(45) Date of Patent: Feb. 10, 2026

(54) ROAD-GUIDED MOTOR VEHICLE AND METHOD FOR RAISING THE PANTOGRAPH OF A POWER COLLECTOR OF A ROAD-GUIDED MOTOR VEHICLE

(71) Applicant: Siemens Mobility GmbH, Munich (DE)

(72) Inventors: Steffen Moelle, Magdeburg (DE); Per Wallentin, Wolfsburg (DE)

(73) Assignee: Siemens Mobility GmbH, Munich (DE)

( * ) Notice: Subject to any disclaimer, the term of this patent is extended or adjusted under 35 U.S.C. 154(b) by 608 days.

(21) Appl. No.: 17/793,120

(22) PCT Filed: Jan. 11, 2021

(86) PCT No.: PCT/EP2021/050384
§ 371 (c)(1),
(2) Date: Jul. 15, 2022

(87) PCT Pub. No.: WO2021/144223
PCT Pub. Date: Jul. 22, 2021

(65) Prior Publication Data
US 2023/0050922 A1   Feb. 16, 2023

(30) Foreign Application Priority Data
Jan. 15, 2020   (DE) ..................... 10 2020 200 449.8

(51) Int. Cl.
*B60L 5/28*   (2006.01)
*B60L 5/10*   (2006.01)
(Continued)

(52) U.S. Cl.
CPC .................. *B60L 5/28* (2013.01); *B60L 5/10* (2013.01); *B60L 5/19* (2013.01); *B60L 5/24* (2013.01);
(Continued)

(58) Field of Classification Search
CPC ...... B60L 5/28; B60L 5/24; B60L 5/30; B60L 5/32; B60L 5/19; B60L 5/10;
(Continued)

(56) References Cited

U.S. PATENT DOCUMENTS

| 8,838,320 B2 | 9/2014 | Stratton et al. |
| 2015/0239349 A1* | 8/2015 | Keil .......................... B60L 5/08 191/59.1 |
| 2016/0375796 A1 | 12/2016 | Gruenjes |

FOREIGN PATENT DOCUMENTS

| CN | 106080212 A | 11/2016 |
| CN | 108674192 A * | 10/2018 |

(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

A road-guided motor vehicle includes a power collector for an overhead line and an actuator arrangement. The power collector is controlled by the actuator arrangement from a first, pantograph-lowered into a second, pantograph-raised position or vice versa. The power collector is assigned a sensor arrangement having a data connection to a control unit of the actuator arrangement. The control unit is configured such that a contact pressure of power collector against overhead line is detected or determined using sensor arrangement data, a memory with spatially resolved contact pressures for the power collector and a position ascertaining unit. At a motor vehicle position determined by the position ascertaining unit, an associated contact pressure is read out from the memory and automatically set by the control unit or signaled to a motor vehicle driver. A method for raising a power collector pantograph onto an overhead line is also provided.

9 Claims, 1 Drawing Sheet

(51) Int. Cl.
*B60L 5/19* (2006.01)
*B60L 5/24* (2006.01)
*B60L 5/30* (2006.01)
*B60L 5/32* (2006.01)

(52) U.S. Cl.
CPC .................. *B60L 5/30* (2013.01); *B60L 5/32* (2013.01); *B60L 2200/18* (2013.01); *B60L 2200/36* (2013.01); *B60L 2200/40* (2013.01); *B60L 2250/16* (2013.01)

(58) Field of Classification Search
CPC ............. B60L 2200/18; B60L 2200/40; B60L 2200/36; B60L 2250/16
USPC ........................................................ 191/45 R
See application file for complete search history.

(56) References Cited

FOREIGN PATENT DOCUMENTS

| | | | | |
|---|---|---|---|---|
| DE | 10324790 | A1 * | 12/2004 | ................ B60L 5/28 |
| DE | 102012213460 | A1 * | 2/2014 | .......... B60L 11/1842 |
| DE | 102013007622 | A1 * | 10/2014 | ................ B60L 5/10 |
| DE | 112013001814 | T5 | 2/2015 | |
| DE | 102014111264 | A1 * | 2/2016 | ................ B60L 5/16 |
| DE | 102015213071 | A1 | 1/2017 | |
| DE | 102016201416 | A1 | 8/2017 | |
| DE | 102017214153 | B3 * | 12/2018 | |
| EP | 3000644 | A1 * | 3/2016 | ............. B60L 5/045 |
| EP | 3238976 | A1 * | 11/2017 | ................ B60L 5/32 |
| JP | H07123505 | A | 5/1995 | |
| KR | 20120074520 | A * | 7/2012 | |
| WO | WO-2009018612 | A1 * | 2/2009 | ................ B60L 5/24 |
| WO | WO-2015028291 | A2 * | 3/2015 | ................ B60L 5/18 |

* cited by examiner

ROAD-GUIDED MOTOR VEHICLE AND METHOD FOR RAISING THE PANTOGRAPH OF A POWER COLLECTOR OF A ROAD-GUIDED MOTOR VEHICLE

FIELD AND BACKGROUND OF THE INVENTION

The invention relates to a road-guided motor vehicle and a method for raising the pantograph of a power collector of a road-guided motor vehicle.

It is known to embody road-guided motor vehicles with at least one power collector in order to supply electrical energy to the motor vehicle from at least one overhead line. The power collectors are also referred to as pantographs. In this process the electrical energy can be used to drive the motor vehicle and a high-voltage battery can additionally be charged so that overall the range of such electrical vehicles is increased.

Here an overhead line must be identified by the motor vehicle, since not all sections of line are provided with such overhead lines and these are typically only assigned to one roadway. Different approaches exist for this purpose.

DE 11 2013 001 814 T5 discloses a system for automatically guiding an off-road truck to a work area, wherein the work area comprises a trolley wire for supplying electrical energy to the off-road truck, wherein the trolley wire runs along a road which has two or more features at the road edge. The system comprises an overhead power collector for selectively contacting the trolley wire, one or more sensors, which are assigned to the off-road truck and a control facility which is connected to the one or more sensors and a machine steering controller and is embodied so that it detects a position of the off-road truck with respect to the trolley wire by detecting the two or more features at the road edge and steers the truck automatically by way of the machine steering controller so that the overhead power collector is kept in contact with the trolley wire. Here the actual pantograph-raising process can take place automatically or manually.

27 DE 10 2015 213 071 A1 discloses a contact wire detection apparatus for a path system with a track-bound power supply system, in particular an overhead line system. Here the apparatus has a detector unit, which is arranged in a stationary manner relative to a position of an assigned contact wire of the power supply system and is designed to determine a position of an electrical vehicle located on the path system. Furthermore, the apparatus has a relative position determination unit, which is designed to determine a relative position of the electrical vehicle in relation to the contact wire on the basis of the determined position of the electrical vehicle and the position of the contact wire of the power supply system. Finally, the apparatus has a position information transmission unit, which is designed to wirelessly transfer the determined relative position to the relevant electrical vehicle.

DE 10 2016 201 416 A1 discloses a method for monitoring a contact wire running along a route, in which at least one measuring variable that is representative of a contact quality between the contact wire and a power collector of a vehicle is determined and in which at least one interruption is determined on the basis of at least the at least one measuring variable, at which interruption the determined measuring variable lies at least once outside of a fixed permissible range. Here the route is in particular a railroad line. Here a position and/or speed of the vehicle is detected at the at least one determined interruption. As a measuring variable a radiation representative of an arc between the power collector and the contact wire is determined, for instance. Here a contact force can additionally be determined between the power collector and the contact wire. The measuring variable can also determine an acceleration of the power collector. In this way the outlay involved in additional test runs and test vehicles can be saved and the state of the contact wire can additionally be detected with each regular journey on the route. As a result, maintenance schedules can be adjusted optimally or maintenance calls can be requested specifically.

With road-guided motor vehicles, there is the problem here that bumps in the road or damage to the roadway may cause the contact between the power collector and the overhead line to break, wherein in these cases the power collector is lowered in order to prevent an arcing. To resolve this, the contact pressure could be increased, which increases the abrasion and thus the wear, however.

SUMMARY OF THE INVENTION

The technical problem underlying the invention is to create a road-guided motor vehicle, in which contact with an overhead line is improved, and to provide a suitable method.

The technical problem is solved by a road-guided motor vehicle having the features described below and a method having the features described below. Further advantageous embodiments of the invention become apparent from the subclaims.

The road-guided motor vehicle has at least one power collector for at least one overhead line and at least one actuator arrangement. The motor vehicle is embodied so that the at least one power collector is controlled by means of the actuator arrangement from a first pantograph-lowered position into a second pantograph-raised position or vice versa. Furthermore, at least one sensor system, which is connected via data technology to a control device of the actuator arrangement, is assigned to the power collector, wherein the control device is embodied so that a contact pressure of the power collector on the overhead line is detected or determined by means of the data of the sensor system. Furthermore, the motor vehicle has a storage device with spatially resolved contact pressures and a position determination unit, wherein the motor vehicle is embodied such that an associated contact pressure is read out from the storage device at a position of the motor vehicle which is determined by the position determination unit. The read-out contact pressure is then set automatically by the control device or signaled to the motor vehicle driver so that he can manually set this. This enables an optimized contact pressure to be set, which is adjusted in particular to the local bumps in the road so that the frequency of a break in contact between the power collector and the overhead line is reduced, but the abrasion or wear is only as significant as necessary. The range of the road-guided motor vehicle is increased as a result. The contact pressures can be stored here in a digital road map. Here the position determination unit can be a satellite-assisted position receiver. This can then comprise further sensor systems for improving the position signal. Alternatively or in addition, provision can also be made to revert back to stationary data next to the roadway, as described in the prior art.

In one embodiment, the motor vehicle is embodied to set a previously defined contact pressure for a position of the motor vehicle in the event of contact pressures being absent in the storage device.

In one embodiment, the previously defined contact pressure is a minimum permissible contact pressure. Therefore, the abrasion is minimized, but the probability of a break in contact is increased. If there is no break in contact, the contact pressure is retained for this position in the future.

If by contrast there is a break in contact, the stored contact pressure is increased for this position of the motor vehicle.

If a break in contact occurs again upon the next journey, the contact pressure is further increased until no further break in contact occurs or a maximum contact pressure is achieved.

The motor vehicle therefore sets the optimal contact pressure in a self-learning manner.

In an alternative embodiment, the previously defined contact pressure is an average contact pressure (e.g. arithmetic mean value of minimum and maximum contact pressure). Provision can be made here for the contact pressure to be reduced in the case of no break in contact in order to determine an optimum contact pressure which ensures a safe contacting with minimum contact pressure.

It would basically also be conceivable for the previously defined contact pressure to be a maximum contact pressure, which is then preferably successively reduced in size until there is a break in contact, wherein the contact pressure is then increased again correspondingly. With the maximum contact pressure, the learning process is therefore not necessarily, but preferably, carried out.

In one embodiment, the motor vehicle is embodied so that errors in the contacting between the power collector and overhead line are detected in a spatially resolved manner and a contact pressure which counteracts the error is written into the storage device, as was already described above.

In one further embodiment, the motor vehicle is embodied with an air interface, wherein the motor vehicle is embodied to transfer contact pressures updated by way of the air interface to a control center and/or other motor vehicles and/or to receive and store contact pressures updated by way of the air interface from a control center and/or other motor vehicles.

The learning process can be sped up significantly as a result.

With data, the type of vehicles and/or power collectors, from which the data originates, are to be taken into account.

In respect of the procedural embodiment of the invention, reference can be made here in full to the preceding embodiments.

The invention is explained in more detail below with reference to preferred exemplary embodiments.

DETAILED DESCRIPTION OF THE INVENTION

Figure 1:
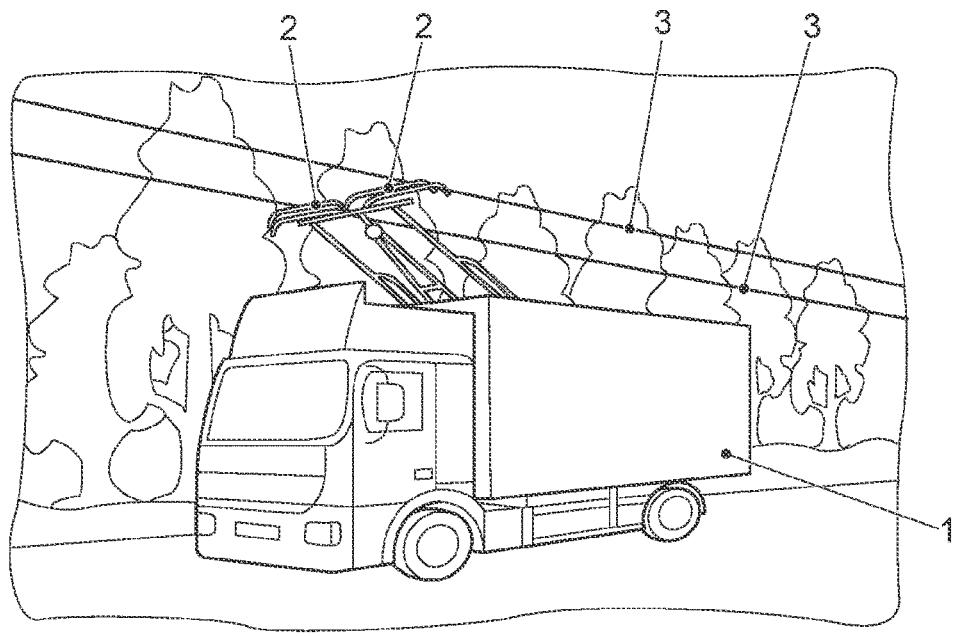
FIG. 1 shows a schematic representation of a road-guided motor vehicle with power collectors for overhead lines and FIG. 2 shows a schematic block diagram of an apparatus for controlling a power collector.

FIG. 1 shows a road-guided motor vehicle 1 with two power collectors 2 for making contact with overhead lines 3, wherein in FIG. 1 the power collector 2 is shown in a pantograph-raised position. If no overhead lines 3 are available, for instance, the power collectors 2 are moved into a retracted, pantograph-lowered position.

Figure 2:
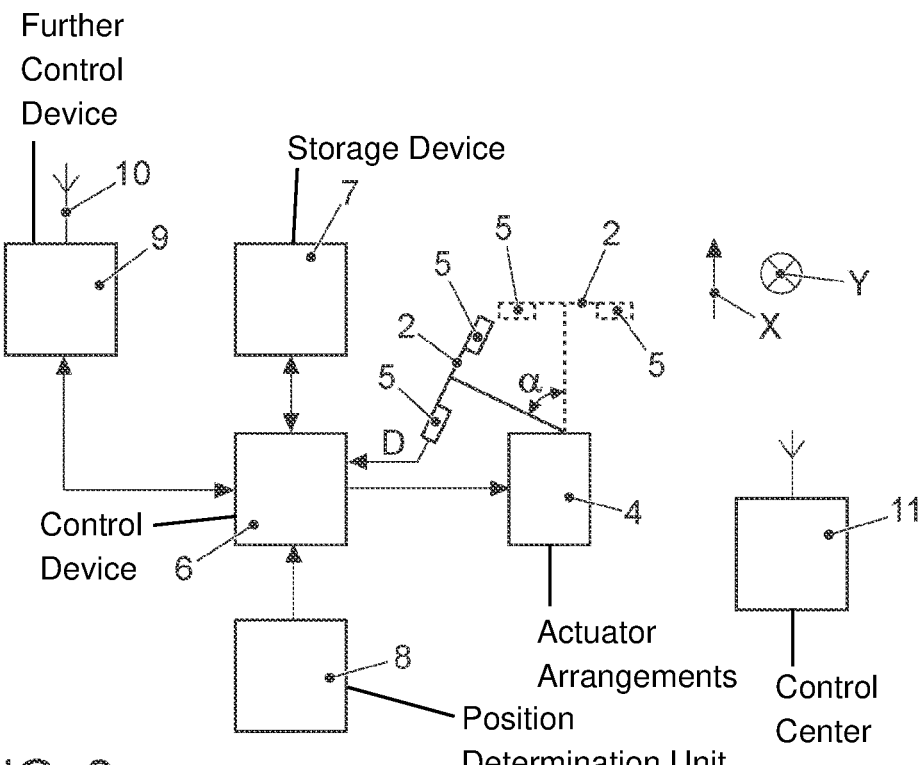

FIG. 2 shows a schematic block diagram of an apparatus for controlling at least one power collector 2. The apparatus has at least one actuator arrangement 4, by means of which the power collector 2 can be moved from the pantograph-lowered position shown into a second pantograph-raised position and vice versa, for instance by the power collector 2 being pivotable upward about an angle $\alpha$. Depending on the position of the overhead line 3 and the angle $\alpha$, a specific contact pressure is adjusted between the power collector 2 and overhead line. In addition or alternatively, the actuator arrangement 4 can be embodied so as to displace the power collector 2 in the Y-direction and/or X-direction.

Alternatively or in addition, the actuator arrangement 4 can also be an air spring system which raises or lowers the entire vehicle. Here the contact pressure can be controlled by the degree of raising. Here provision can be made for the power collector 2 to be folded up or down by means of a first actuator arrangement 4, the actual pantograph-raising process nevertheless only takes place by means of the air spring system as a second actuator arrangement 4. It is also possible for the pantograph-raising to already take place by folding up the power collector 2, wherein the contact pressure is then controlled or set by the air spring system.

Furthermore, the apparatus has a sensor system 5, which is arranged on the power collector 2, wherein the sensor system 5 transfers its data D to a control device 6 that controls the actuator arrangement 4. The sensor system 5 is embodied for instance as a pressure or force sensor or as an acceleration sensor, wherein the control device 6 is embodied so as to detect or determine a contact pressure between power collector 2 and overhead line 3 from the data D.

The control device 6 is further connected to a storage device 7, a position determination unit 8 and a further control device 9 with an air interface 10. The control device 9 and the air interface 10 together form a communication module, in order to communicate with a control center and/or other motor vehicles. Contact pressures between the at least one power collector 2 and the at least one overhead line 3 are stored in the storage device 7 in a spatially resolved manner. The spatially resolved contact pressures can be received in advance for instance by a measuring motor vehicle, and stored in the storage device 7, where these are then available for controlling the actuator arrangement 4. Here the contact pressure at sections with a large bumps in the road, potholes etc. is increased compared with flat sections of road.

During the journey the position determination unit 8 determines the current position of the motor vehicle 1 and transfers this to the control device 6. This now determines for instance on the basis of the data in the storage device 7 and/or by means of further sensor systems whether an overhead line 3 is available. If an overhead line 3 is available, the control device 6 reads out the associated contact pressure and sets this by means of the actuator arrangement 4, wherein the set contact pressure is checked by the sensor system 5. If a break in contact then occurs between the power collector 2 and the overhead line 3, this is stored in a spatially resolved manner and the future contact pressure is increased. The increase in the contact pressure is preferably carried out here gradually. This information can then also be made available to the control center 11 and/or other motor vehicles by way of the control device 9 and the air interface 10, so that other motor vehicles adjust their contact pressure at this position. Similarly, the motor vehicle 1 can receive and store adjusted or updated contact pressures from the control center 11 and/or other motor vehicles.

Previously defined contact pressures can be used at positions where there are still no empirically determined contact pressures in the storage device 7. This can be a minimum, maximum or an average contact pressure, for instance. If a maximum contact pressure is selected, for instance, this can be reduced until a break in contact occurs. This can also take place during the contact process. The pantograph-raising process can then be repeated with the next higher contact pressure. If the quality of the roadway deteriorates, during the next journey it may result in a break in contact and the contact pressure being further increased. A self-learning system which learns the optimal contact pressures is therefore made available.

The control center 11 can conclude the quality of the roadway and/or the overhead line 3 from the data of the motor vehicles 1 by way of the contact pressures and if necessary, trigger repair orders.

LIST OF REFERENCE CHARACTERS 1 motor vehicle
2 power collector
3 overhead line
4 actuator arrangement
5 sensor system
6 control device
7 storage device
8 position determination unit
9 control device
10 air interface
11 control center

The invention claimed is:

1. A road-guided motor vehicle, comprising:
a pantograph having at least one power collector for at least one overhead line;
at least one actuator arrangement controlling said at least one power collector from a first pantograph-lowered position into a second pantograph-raised position or vice versa;
a control device for said at least one actuator arrangement;
at least one sensor system associated with said at least one power collector, said at least one sensor system having a data connection to said control device;
said control device configured to detect or determine a contact pressure of said at least one power collector at the at least one overhead line by using data of said at least one sensor system, a storage device with spatially resolved contact pressures for said at least one power collector and a position determination unit;
said control device reading out from said storage device and automatically setting or signaling to a motor vehicle driver an associated contact pressure at a position of the motor vehicle determined by said position determination unit; and
the motor vehicle being configured to detect errors during contacting and positions/coordinates where height differences occur between said at least one power collector and the at least one overhead line in a spatially resolved manner, and a contact pressure counteracting the detected errors being written into said at least one storage device.

2. The road-guided motor vehicle according to claim 1, wherein the motor vehicle is configured to set a previously defined contact pressure for a position, upon contact pressures being absent in said storage device.

3. The road-guided motor vehicle according to claim 1, wherein the previously defined contact pressure is a minimum permissible contact pressure.

4. The road-guided motor vehicle according to claim 1, wherein the previously defined contact pressure is an average permissible contact pressure.

5. The road-guided motor vehicle according to claim 1, which further comprises a control center, and an air interface configured to at least one of transfer updated contact pressures to at least one of said control center or other motor vehicles or receive and store updated contact pressures from at least one of said control center or other motor vehicles.

6. A method for raising a pantograph of a power collector of a road-guided motor vehicle at an overhead line, the method comprising:
determining a position of the motor vehicle;
storing contact pressures for the determined position; and
using a control device to actuate an actuator arrangement, for automatically setting the stored contact pressure or signaling the stored contact pressure; and
detecting errors during contacting and positions/coordinates where height differences occur between the power collector and the overhead line in a spatially resolved manner, and writing a contact pressure counteracting the detected errors into at least one storage device.

7. The method according to claim 6, which further comprises setting a previously defined contact pressure upon an absence of contact pressures for a position.

8. The method according to claim 7, which further comprises using a minimum permissible contact pressure as the previously defined contact pressure.

9. The method according to claim 7, which further comprises using an average permissible contact pressure as the previously defined contact pressure.

* * * * *